(12) United States Patent
Zheng et al.

(10) Patent No.: US 12,527,914 B2
(45) Date of Patent: Jan. 20, 2026

(54) INSULIN PUMP INFUSION CONTROL METHOD

(71) Applicant: MICROTECH MEDICAL (HANGZHOU) CO., LTD., Hangzhou (CN)

(72) Inventors: Pan Zheng, Hangzhou (CN); Dore Mark, Hangzhou (CN); Jianfeng Lv, Hangzhou (CN)

(73) Assignee: MICROTECH MEDICAL (HANGZHOU) CO., LTD., Hangzhou (CN)

( * ) Notice: Subject to any disclaimer, the term of this patent is extended or adjusted under 35 U.S.C. 154(b) by 829 days.

(21) Appl. No.: 17/799,344

(22) PCT Filed: Dec. 10, 2020

(86) PCT No.: PCT/CN2020/135161
§ 371 (c)(1),
(2) Date: Jan. 23, 2023

(87) PCT Pub. No.: WO2021/159840
PCT Pub. Date: Aug. 19, 2021

(65) Prior Publication Data
US 2023/0141293 A1      May 11, 2023

(30) Foreign Application Priority Data
Feb. 14, 2020   (CN) .......................... 202010093449.2

(51) Int. Cl.
*A61M 5/172*      (2006.01)
*A61M 5/142*      (2006.01)

(52) U.S. Cl.
CPC ........ *A61M 5/172* (2013.01); *A61M 5/14244* (2013.01); *A61M 2205/50* (2013.01); *A61M 2205/581* (2013.01)

(58) Field of Classification Search
CPC ...... A61M 5/1723; A61M 2005/14208; A61M 2205/50; A61M 2205/3546;
(Continued)

(56) References Cited

U.S. PATENT DOCUMENTS

| | | | |
|---|---|---|---|
| 2003/0163223 A1* | 8/2003 | Blomquist | .......... A61M 5/1723 700/282 |
| 2011/0098638 A1 | 4/2011 | Chawla et al. | |

(Continued)

FOREIGN PATENT DOCUMENTS

| | | |
|---|---|---|
| CN | 101663059 A | 3/2010 |
| CN | 104010565 B | 8/2016 |
| CN | 111317889 A | 6/2020 |

OTHER PUBLICATIONS

International Search Report, China National Intellectual Property Administration, Application No. PCT/CN2020/135161, mailed Mar. 17, 2021, 6 pages.

*Primary Examiner* — Laura A Bouchelle
*Assistant Examiner* — Marissa Taylor
(74) *Attorney, Agent, or Firm* — Ziegler IP Law Group, LLC.

(57) ABSTRACT

An insulin pump bolus infusion control method. A control module of a pump body controls the pump body to start a bolus infusion control mode after receiving a function starting signal; in the bolus infusion control mode, a bolus key of a control terminal or a bolus key of an insulin pump body sends an infusion dosage signal to the control module by means of one or more operations; if the control module receives a confirmation signal within a predetermined period of time, then the control module controls the pump body to start bolus infusion; and if the control module receives a cancellation signal or does not receive the confirmation signal within a predetermined period of time, then the control module controls the pump body to exit the bolus (Continued)

infusion mode. Using the method enables an insulin pump to execute a more reasonable control when carrying out the bolus infusion, i.e., starting, setting and implementation of the bolus infusion, and enables a simple and quick operation.

7 Claims, 5 Drawing Sheets

(58) Field of Classification Search
CPC ............ A61M 2205/581; A61M 5/172; A61M 5/14244; A61M 5/168; A61M 2205/58; G16H 20/10; G16H 20/17
See application file for complete search history.

(56) References Cited

U.S. PATENT DOCUMENTS

| | | | |
|---|---|---|---|
| 2015/0057518 A1 | 2/2015 | Lebel et al. | |
| 2016/0361494 A1* | 12/2016 | Jürg | A61M 5/172 |
| 2017/0311904 A1* | 11/2017 | Davis | G16H 50/20 |
| 2018/0147348 A1 | 5/2018 | McCann et al. | |
| 2018/0296757 A1* | 10/2018 | Finan | G16H 20/17 |

* cited by examiner

Fig.8 ions, wherein:

INSULIN PUMP INFUSION CONTROL METHOD

TECHNICAL FIELD

The present invention relates to the technical field of medical supplies, in particular to an insulin pump infusion control method.

BACKGROUND ART

The basic function of an insulin pump is to simulate the secretion function of the pancreas, a conventional dosage infusion of the insulin into a user' subcutaneous skin is performed continuously at an interval according to a dosage required by a human body to maintain stability of blood glucose throughout the day and achieve the purpose of controlling diabetes. The existing insulin pump mainly includes a drug delivery device and a drug storage device, the drug delivery device is a driving part, and a driving device is used to squeeze the drug storage device to continuously squeeze insulin in the drug storage device into the user's subcutaneous skin.

During the day, the human body's blood glucose levels are different, and thus the insulin amounts injected are different; especially within a period of time after a meal, due to an increase in blood glucose value, the amount of insulin required will greatly increase. In other words, it is necessary to carry out a bolus infusion higher than the above conventional dosage. Accordingly, it is necessary to have reasonable control over the bolus infusion of the insulin pump.

SUMMARY OF THE INVENTION

In view of the above, the main objective of the present invention is to provide art insulin pump infusion control method, which can reasonably control bolus infusion.

In order to achieve the above objective, according to one aspect of the present invention, an insulin pump infusion control method is provided, characterized in that: a control module of a pump body controls the pump body to start a bolus infusion control mode after receiving a function starting signal; in the bolus infusion control mode, a bolus key of a control terminal or a bolus key of an insulin pump body sends an infusion dosage signal to the control module by means of one or more operations, wherein, the control terminal or the insulin pump body emits one reminder tone or a plurality of reminder tones of different frequencies in response to the one or more operations; the control module receives the infusion dosage signal, and also emits the one reminder tone or the plurality of reminder tones of different frequencies within a predetermined period of time as confirmation of the operations; if the control terminal receives a confirmation signal within a predetermined period of time, the control module controls the pump body to start bolus infusion; and if the control module receives a cancellation signal or does not receive the confirmation signal within a predetermined period of time, the control module controls the pump body to exit the bolus infusion mode.

Optionally, the function starting signal is sent to the control module by operating the bolus key of the control terminal or the bolus key of the insulin pump body.

Optionally, the control terminal or the insulin pump body sends the infusion dosage signal to the control module within a predetermined period of time after the control module of the pump body receives the function starting signal; and the control module controls the pump body to exit the bolus infusion mode if the infusion dosage signal is not sent to the control module within a predetermined time period.

Optionally, an operation method of sending the infusion dosage signal to the control module by operating the bolus key of the control terminal or the bolus key of the insulin pump body is: adjusting an insulin infusion dosage by means of the number of times of operating the bolus key of the control terminal or the bolus key of the insulin pump body, wherein, the insulin infusion dosage is increased by a fixed increment each time the bolus key of the control terminal or the bolus key of the insulin pump body is operated.

Optionally, the function starting signal is sent to the control module by operating the bolus key of the insulin pump body, and when the control module of the pump body receives the function starting signal, the control module controls the pump body to stop the bolus infusion if the pup body is carrying out the bolus infusion.

Optionally, the pump body is controlled to emit a sound reminder signal when starting the bolus infusion mode.

Optionally, the control terminal or the insulin pump body will emit reminder tones of n frequencies, the reminder tones of n frequencies has an order; and the reminder tones are repeatedly emitted in a cyclical pattern when the number of times of operating the bolus key of the control terminal or the bolus key of the insulin pump body is greater than n.

According to the technical solution of the present invention, in the bolus infusion mode, the control module receives the infusion dosage signal, and starts the bolus infusion operation after a determination is made, wherein, the infusion dosage signal is sent by operating the bolus key of the control terminal or the bolus key of the insulin pump body.

Using the method enables the insulin pump to implement a more reasonable control when carrying out the bolus infusion, i.e., starting, setting and implementation of the bolus infusion, and enables a simple and quick operation.

BRIEF DESCRIPTION OF THE DRAWINGS

The present invention will be described with reference to preferred embodiments of the present invention, particularly figures for the purpose of illustrations rather than limitations, wherein.

DETAILED DESCRIPTION

In an embodiment of the present invention, a bolus infusion operation can be controlled by a control terminal, or by a bolus key on a pump body, wherein, the control terminal is a portable controller and a man-machine interface is provided with the bolus key thereon; and the portable controller transmits information wirelessly for an insulin pump.

Figure 1:
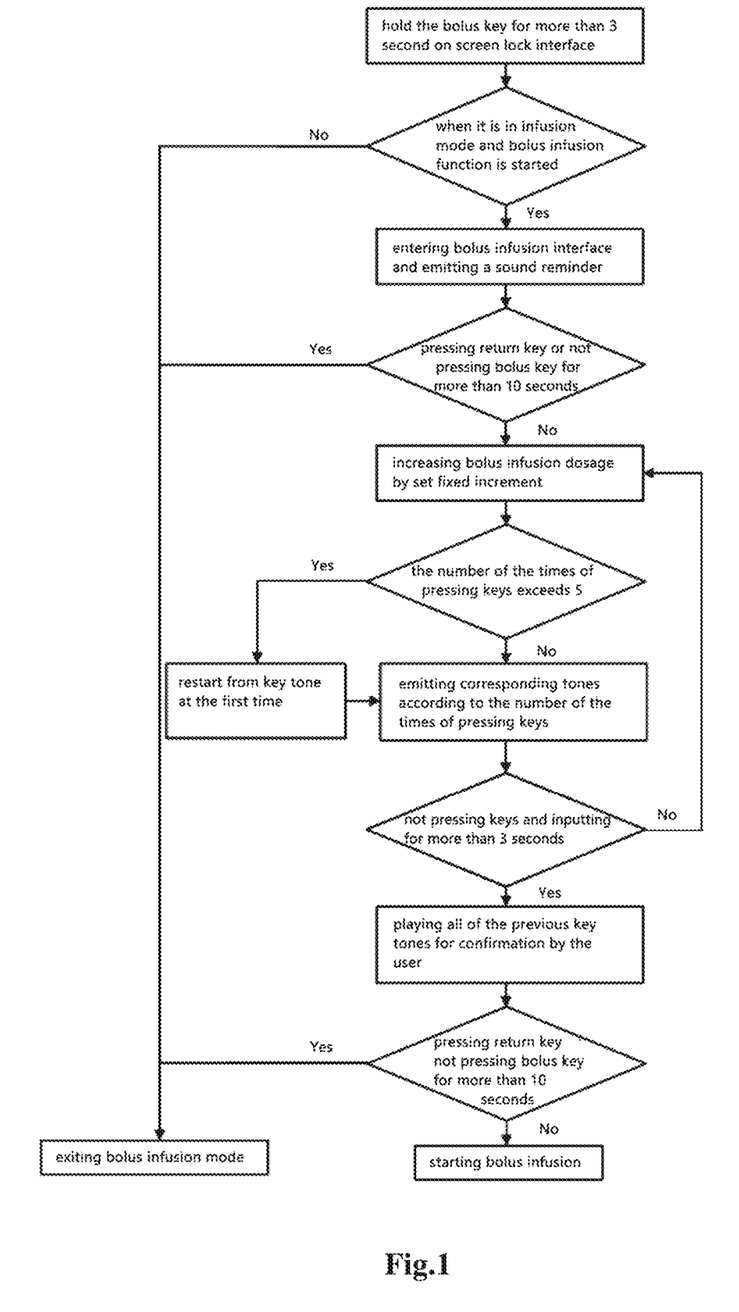
FIG. 1 is a working flow chart of a control terminal carrying out bolus infusion control.

FIG. 1 is a working flow chart of the control terminal carrying out bolus infusion control; as shown in FIG. 1, on a screen lock interface of the portable controller, the bolus key is held for more than 3 seconds, and if an insulin pump is currently in an infusion mode and a bolus infusion function is started, then the portable controller will emit sound reminding to enter a bolus infusion mode.

After entering the bolus infusion mode, if a return key is operated or the bolus key is not operated for more than 10 seconds, the bolus infusion mode is exited; otherwise, the bolus infusion operation will continue. Operation each time means that an infusion dosage is increased by a preset fixed increment, and during the process of operating the bolus key, each time the bolus key is operated, the portable controller will emit a tone (there are 5 tones in total, and after the number of times of operation exceeds 5, the tone will return to start from the first tone). If the bolus key is not pressed for more than 3 seconds, the portable controller will emit a reminder signal, which is the same as the tone emitted by operating the bolus key. In other words, if the bolus key is operated for 4 times, 4 tones will be emitted, and the reminder signal will also emit the 4 tones. If the return key on the portable controller is operated, or if there is no operation within 10 s the bolus infusion mode will exit, while if the bolus key is operated again within 10 s, the bolus infusion will be rapidly started.

Figure 2:
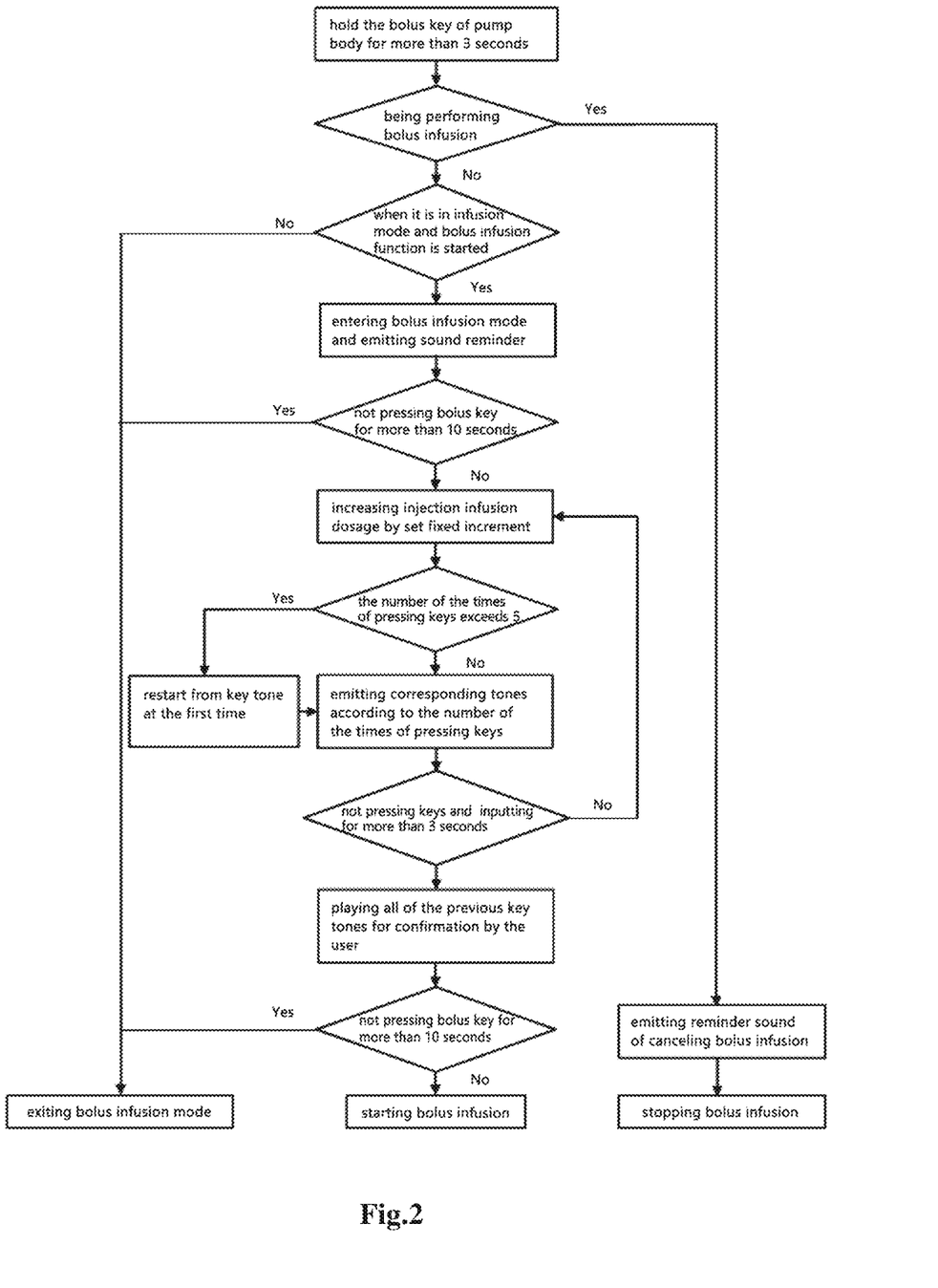
FIG. 2 is a working flow chart of an insulin key on an insulin pump body carrying out bolus infusion control.

As shown in FIG. 2, the bolus key on the pump body is held for more than 3 seconds, and the control module controls the insulin pump to stop the current bolus infusion if the insulin pump is currently carrying out the bolus infusion. The hold action on the bolus key can cancel any bolus infusion operation started by other command instructions. In other words, the bolus key can be used as a key for canceling bolus infusion. If the insulin pump is currently in the infusion mode and the bolus infusion function is started, the pump body will make sound reminding to enter the bolus infusion mode. The bolus key can also be changed into the form of a dial block that can automatically bounce back, the dial block being toggled and bouncing back is equivalent to pressing the key once, and toggling and holding the key is equivalent to pressing the key for a long time (hold). Other modes of operation can also be used, as long as the function similar to the embodiment can be realized.

After entering the bolus infusion mode, if the bolus key is not operated for more than 10 seconds, the bolus infusion mode will exit; otherwise, the bolus infusion operation will continue. The operation each time means that the infusion dosage is increased by a set fixed increment, and during the process of operating the bolus key, each time the bolus key is operated, the insulin pump will emit one tone (there are 5 tones in total, and after the number of times of operations exceeds 5, the tone will return to restart from the first tone). If the operation exceeds 3 seconds, the key is the bolus key, and the insulin pump will emit a reminder signal, which is the same as the tone emitted by operating the bolus key. That is, if the bolus key is operated for 4 times, 4 tones will be emitted, and the reminder signal will also emit 4 tones. After the bolus key is operated to adjust the infusion dosage, if no operation is performed within 10 seconds, the bolus infusion mode exits. On the contrary, if the bolus key is operated again within 10 seconds, a rapid bolus infusion is started.

Figure 3:
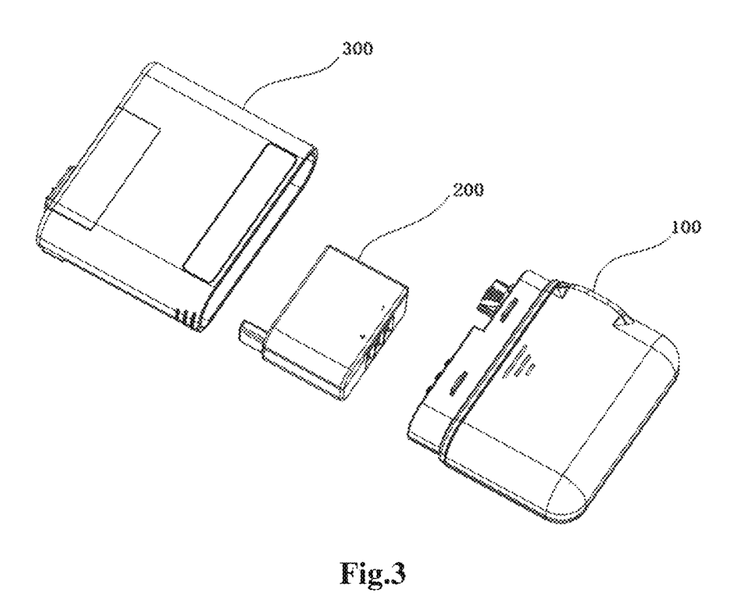
FIG. 3 is a schematic diagram of composite parts of an insulin pump system.
Figure 4:
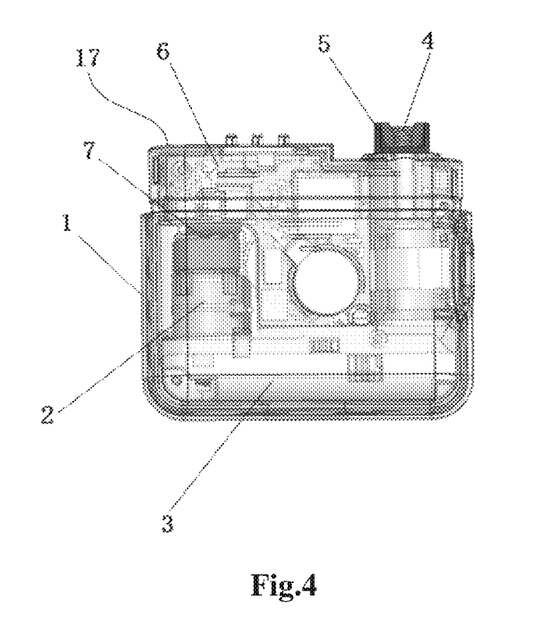
FIG. 4 is a schematic diagram of one side of a drug delivery device.
Figure 5:
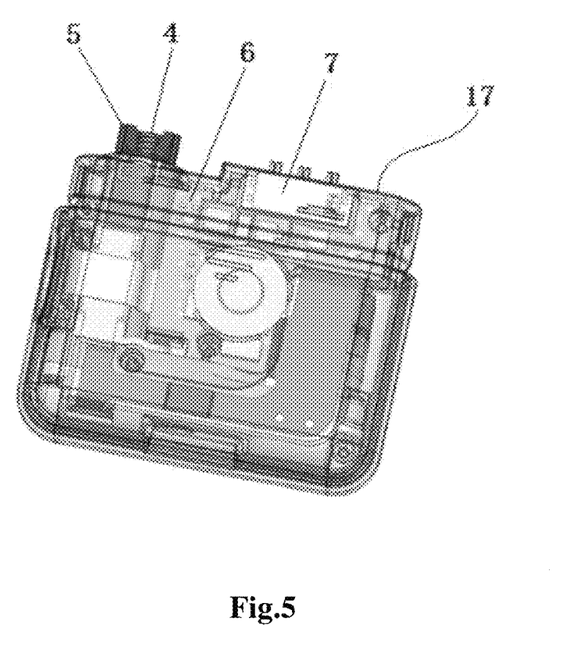
FIG. 5 is a schematic diagram of the other side of the drug delivery device.

In this embodiment, about the bolus infusion of the insulin pump, referring to FIGS. 3 to 5, FIG. 3 is a schematic diagram of composite parts of an insulin pump system according to an embodiment of the invention. A drug delivery device 100, a battery 200 and a drug storage device 300 are three separate parts, and join into an insulin pump system in use. The battery 200 is provided in the drug storage device 300, the drug storage device 300 and the drug delivery device 100 are near the abutting surface, the diameter of one is slightly greater than the other, and thus the two can be partially nested.

FIG. 4 is a schematic diagram of one side of the drug delivery device according to an embodiment of the invention, and FIG. 5 is a schematic diagram of the other side of the drug delivery device. As shown in FIGS. 4 and 5, the drug delivery device 100 is a reusable part, and comprises a housing 1, a transmission assembly and a circuit board assembly; the transmission assembly and the circuit board assembly are provided in the housing 1, and one end face of the housing 1 is an abutting surface 17; the transmission assembly comprises a motor 2, a gear box 3, and a screw rod 4 and a push rod 5 that are coaxial and threaded connected, the motor 2 and the circuit board assembly are connected, the motor 2, the gear box 3 and the push rod 5 are in a U-shaped arrangement, the U-shaped opening faces towards the abutting surface 17, an output end of the motor 2 is connected with one end of the gear box 3, the other end of the gear box 3 is connected with the screw rod 4, and the end of the push rod 5 away from the gear box 3 crosses the abutting surface 17 so as to be located outside the housing 1; the circuit board assembly comprises a printed circuit board 6, a battery connector 7 and a flexible circuit board 8, the motor 2 is connected with the flexible circuit board 8, the battery connector 7 is connected with the printed circuit board 6, the battery connector 7 is provided with metal contacts which protrude out of the abutting surface 17 so as to be located outside the housing 1, the printed circuit board 6 is in an L shape whose one side is located between the abutting surface 17 and one end of the motor 2 away from the gear box 3 and whose other end is located between the motor 2 and the push rod 5.

The drug storage device 300 is a disposable part. After the drug liquid in the drug storage device 300 is used up, the drug storage device 300 is discarded and cannot be reused; the battery 200 and the drug delivery device 100 are reusable parts, the battery 200 is a rechargeable battery equipped with an adapter and can be recharged for reuse, a battery cavity for receiving the battery 200 is provided in the drug storage device 300, the battery 200 is provided in the battery cavity when being joined, and the battery 200 is taken out and reusable when the drug storage device 300 is discarded.

A drug delivery drive transmission state monitoring system proposed in the embodiment of the present invention mainly comprises a motor rotation momentum monitoring device for obtaining a rotation stroke of the motor, a push rod initial position detection device for determining an initial bottom position of the push rod, and a controller for controlling starting and stopping of the motor.

Figure 6:
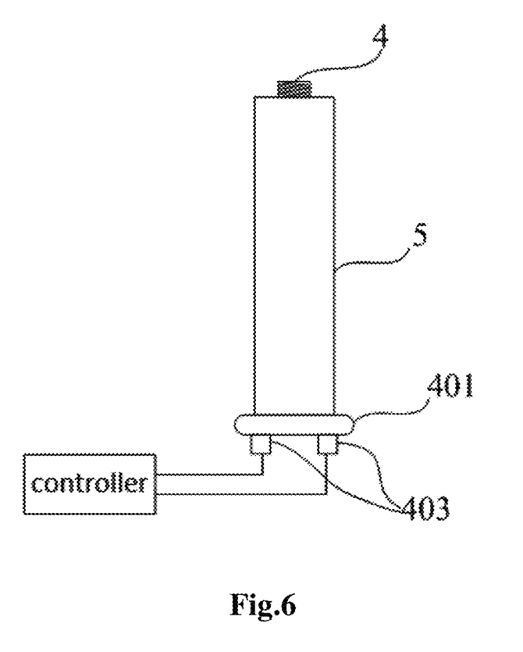
FIG. 6 is a schematic diagram of a circuit principle of a detection device of an initial position of a push rod according to an embodiment of the present invention.

The initial bottom position of the push rod is the position when the push rod does not extend out, and then the drug liquid in the drug liquid cavity is basically full. In order to determine that the push rod is in the initial bottom position, one mode is as shown in FIG. 6, FIG. 6 is a schematic diagram of the circuit principle of the push rod initial position detection device according to the embodiment of the invention, the device mainly comprises two conductive contacts and a conductive sheet therebetween. There is a further sleeve outside the push rod in this embodiment, which is not shown in FIG. 6. In FIG. 6, an end of the push rod 5 is provided with a conductive sheet 401, a surface of a base 402 where the push rod and the screw rod are both located is provided with two conductive contacts 403, when the push rod is in the initial bottom position, the conductive sheet contacts the two conductive contacts at the same time so as to make the two contacts conductive, and the controller detects resistance (or current) between the two conductive contacts 403 to confirm whether the push rod 5 is in the initial bottom position.

Another way to determine that the push rod is in the initial bottom position is to provide two contacts on the surface of the base where the push rod and the lead rod are both located and an elastic conductive material connecting the two contacts. That is, the conductive sheet 401 in FIG. 4 is replaced by an elastic conductive material. The elastic conductive material, e.g., can be conductive rubber, it has a certain elasticity and can avoid the stability issue of electrical conduction when two rigid objects make contact. When the push rod falls back to the initial bottom position, the elastic conductive material is compressed to make its conductivity increase, and by selecting properly parameters and thickness of the elastic conductive material, the conductivity of the elastic conductive material is enabled to be smaller than a preset value when the push rod is in the initial bottom position. In this way, the controller detects resistance between the two conductive contacts and compares it with the preset value, so that it can be determined whether the push rod is in the initial bottom position. The rotation of the motor should be stopped when the push rod reaches the initial bottom position.

Because insulin needs to be infused once at an interval (covering daily continuous quantitative injection, and bolus infusion), the controller can be used to start the motor when the drug needs to be delivered and receive travel information provided by a motor rotation momentum monitoring device according to preset drug delivery instructions, and the motor is stopped when the travel reaches a preset value. Drug delivery information can be edited by the user in one control terminal (a portable controller), and includes daily infusion dosage, a fixed increment for use in making adjustments and the like. The control terminal converts the drug delivery information to drug delivery instructions that a program in the controller can use, the drug delivery instructions mainly include drug delivery time and travel of a stepper motor that reflects the drug delivery dosage, and sends the instructions to the controller in a wireless way such as in an infrared or via Bluetooth.

The above-specified values are determined by the drug delivery dosage, the cross-sectional area of a drug storehouse and the lead of the screw rod in the drug delivery instructions. The drug delivery time and the drug delivery dosage can be set by the user using the control terminal. The control terminal can calculate an advancing distance of the screw rod for each step advanced by the motor according to the lead and the transmission ratio of the screw rod's pitch diameter and a gear box. As well as the number of steps the motor should advance, i.e., the above-specified values, can be calculated when the drug is delivered this time by a combination with the drug delivery dosage and the cross-sectional area of the drug storehouse this time. The number of the steps advanced by the motor is obtained when the infusion is performed, and the motor is stopped when the number of the steps that the motor should advance during the delivery of the drug is reached.

Figure 7:
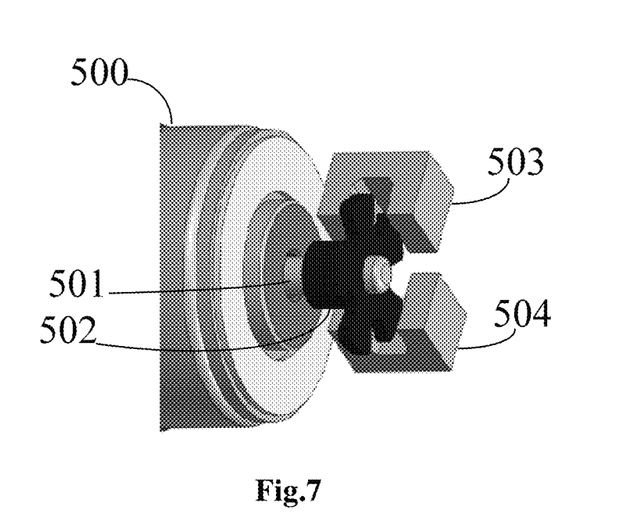
FIG. 7 is a schematic diagram of a device for obtaining the number of steps of a stepper motor according to an embodiment of the present invention.

For this purpose, a counter shown in FIG. 7 is used in this embodiment to obtain the number of the steps of the motor, and FIG. 7 is a schematic diagram of a device for obtaining the number of the steps of a stepped motor according to the embodiment of the present invention. As shown in FIG. 7, a rotational shaft 501 of the stepped motor 500 is provided with an impeller 502, a first light sensor 503 and a second light sensor 504 are fixed on the inner wall of the housing near the propeller or at the base extending out of the inner wall of the housing, or in the cavity where the stepped motor 500 is located, an included angle between the first light sensor 503 and the second light sensor 504 is a multiple of the rotational step length of the stepped motor (in terms of the angle). For example, one lap for the stepper motor is 20 steps, i.e., 360 degrees, then each step rotated is 18 degrees, and the included angle between the two light sensors can be set as 90 degrees. When the impeller 502 is rotating, it cuts light so as to be sensed by the light sensors, the light sensors send corresponding digital signals to the controller so as to obtain the number of the steps of the motor. The light sensors herein can use a U-type optocoupler, a correlative photoelectric switch and the like, and need to be capable of sensing light changes caused by the rotation of the propeller.

During the infusion process, the controller monitors pressure of an infusion pipeline in real-time. If the pressure exceeds a certain set value, it is considered that the infusion pipeline is blocked. At this time, an alarm message will be emitted, which can be received by a buzzer or light emitting device and remind the user by means of sound or flash. Because the pressure in the infusion pipeline is positively correlated with the pressure on the push rod, the pressure upon the push rod is collected by a thin-sheet pressure sensor in this embodiment, as shown in FIG. 8, and FIG. 8 is a schematic diagram of a mounting state of an infusion pressure sensor according to the embodiment of the present invention.

Figure 8:
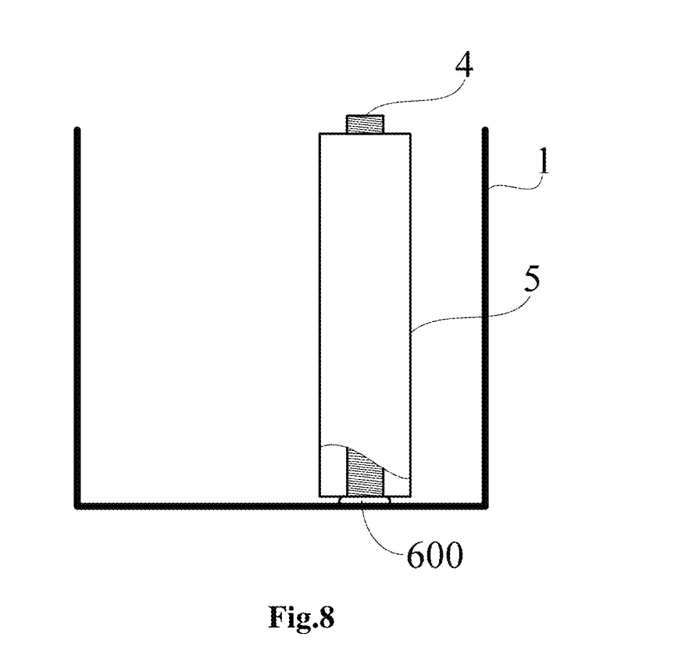
FIG. 8 is a schematic diagram of a mounting state of an infusion pressure sensor according to an embodiment of the present invention.

As shown in FIG. 8, the thin-sheet pressure sensor 600 is sandwiched between one end face 601 of the screw rod and the inner wall of the housing 1 of the drug delivery device (the housing is briefly shown in the figure). Besides, it may be also mounted between the end face and the base on the inner wall of the housing or other connectors, as long as the thin-sheet pressure sensor is enabled to sense a reaction force from the push rod when the screw rod drives the push rod. The thin-sheet pressure sensor 600 converts the sensed pressure into a digital signal and then sends it to the controller (the controller and the connecting line between the controller and the thin-sheet pressure sensor 600 are not shown in the figure).

According to the technical solution of the embodiment of the present invention, the initial bottom position of the push rod is determined by the push rod initial position detection device, and the controller in combination with the motor rotation momentum monitoring device controls starting and stopping of the stepped motor to achieve precise drug delivery. The infusion pressure is monitored during the infusion process, and an alarm signal is emitted when the pressure is abnormal, thereby improving the reliability of drug delivery.

The above embodiments do not constitute limitations upon the protection scope of the present invention. The person skilled in the art should understand that a wide variety of modifications, combinations, sub-combinations and substitutions can be made depending on design requirements and other factors. Any modification, equivalent substitution and improvement made within the spirit and principles of the present invention shall be covered in the protection scope of the present invention.

The invention claimed is:

1. An insulin pump infusion control method, comprising:
a control module of an insulin pump body controls the insulin pump body to start a bolus infusion control mode after receiving a function starting signal;
in the bolus infusion control mode, a bolus key of a control terminal or a bolus key of the insulin pump body sends an infusion dosage signal to the control module by means of one or more operations, wherein, the control terminal or the insulin pump body emits one reminder tone or a plurality of reminder tones of different frequencies in response to the one or more operations;
the control module receives the infusion dosage signal, and also emits one reminder tone or the plurality of reminder tones of different frequencies within a predetermined period of time as confirmation of the one or more operations; and
if the control terminal receives a confirmation signal within the predetermined period of time, the control module controls the insulin pump body to start bolus infusion; if the control module receives a cancellation signal or does not receive the confirmation signal within the predetermined period of time, the control module controls the insulin pump body to exit the bolus infusion control mode.

2. The insulin pump infusion control method according to claim 1, further comprising sending the function starting signal to the control module by operating the bolus key of the control terminal or the bolus key of the insulin pump body.

3. The insulin pump infusion control method according to claim 2, wherein,
the control terminal or the insulin pump body sends the infusion dosage signal to the control module within the predetermined period of time after the control module of the insulin pump body receives the function starting signal; and
the control module controls the insulin pump body to exit the bolus infusion control mode if the infusion dosage signal is not sent to the control module within the predetermined time period.

4. The insulin pump infusion control method according to claim 2, wherein, an operation method of sending the infusion dosage signal to the control module by operating the bolus key of the control terminal or the bolus key of the insulin pump body is: adjusting an insulin infusion dosage by means of the number of times of operating the bolus key of the control terminal or the bolus key of the insulin pump body, wherein, the insulin infusion dosage is increased by a fixed increment each time the bolus key of the control terminal or the bolus key of the insulin pump body is operated.

5. The insulin pump infusion control method according to claim 2, further comprising sending the function starting signal to the control module by operating the bolus key of the insulin pump body, and controlling, by the control module, the insulin pump body to stop the bolus infusion if the insulin pump body is carrying out the bolus infusion.

6. The insulin pump infusion control method according to claim 1, further comprising controlling the insulin pump body to emit a sound reminder signal when starting the bolus infusion control mode.

7. The insulin pump infusion control method according to claim 1, wherein that,
the control terminal or the insulin pump body will emit the plurality of reminder tones of n frequencies, the reminder tones of n frequencies has an order; and
the reminder tones are repeatedly emitted in a cyclical pattern when the number of times of operating the bolus key of the control terminal or the bolus key of the insulin pump body is greater than n.

* * * * *